United States Patent
Yang

(10) Patent No.: US 10,924,402 B2
(45) Date of Patent: Feb. 16, 2021

(54) METHOD AND SERVER FOR DETERMINING A MAPPING ADDRESS OF A DATA STREAM

(71) Applicant: WANGSU SCIENCE & TECHNOLOGY CO., LTD., Shanghai (CN)

(72) Inventor: Shangbin Yang, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 121 days.

(21) Appl. No.: 16/461,231

(22) PCT Filed: Aug. 21, 2018

(86) PCT No.: PCT/CN2018/101522
§ 371 (c)(1),
(2) Date: May 15, 2019

(87) PCT Pub. No.: WO2020/000603
PCT Pub. Date: Jan. 2, 2020

(65) Prior Publication Data
US 2020/0274803 A1    Aug. 27, 2020

(30) Foreign Application Priority Data

Jun. 29, 2018  (CN) .......................... 201810701206.5

(51) Int. Cl.
*H04L 12/741*   (2013.01)
*G06F 16/2455*  (2019.01)

(52) U.S. Cl.
CPC ........ *H04L 45/74* (2013.01); *G06F 16/24568* (2019.01)

(58) Field of Classification Search
CPC ..... H04L 45/74; H04L 41/0803; H04L 45/04; H04L 45/72; H04L 61/256
See application file for complete search history.

(56) References Cited

U.S. PATENT DOCUMENTS 6,154,839 A    11/2000 Arrow et al.
6,965,599 B1   11/2005 Sakurai et al.
(Continued)

FOREIGN PATENT DOCUMENTS

CN   103685395 A   3/2014
CN   105100300 A   11/2015
(Continued)

OTHER PUBLICATIONS

The European Patent Office (EPO) The Extended European Search Report for 18921289.7 dated Apr. 2, 2020 9 Pages.
(Continued)

*Primary Examiner* — Shean Tokuta
(74) *Attorney, Agent, or Firm* — Anova Law Group, PLLC

(57) ABSTRACT

A method for determining a mapping address of a data stream includes: receiving a newly created current data stream, and recording a configuration identifier and a route identifier of the current data stream; querying, according to source information of the current data stream, a historical data stream that matches the current data stream, where the source information includes at least a source transport protocol, a source address, and a source port, and the historical data stream includes a target mapping address; and comparing the configuration identifier and the route identifier of the current data stream with a configuration identifier and a route identifier of the historical data stream, and determining, according to a comparison result, whether the
(Continued)

current data stream continues to use the target mapping address of the historical data stream.

14 Claims, 4 Drawing Sheets

(56) References Cited

U.S. PATENT DOCUMENTS

| | | | |
|---|---|---|---|
| 9,178,846 B1 | 11/2015 | Kamisetty et al. | |
| 10,534,601 B1* | 1/2020 | Venkata | H04L 45/74 |
| 10,805,114 B2* | 10/2020 | Cidon | H04L 41/0803 |
| 2015/0039784 A1 | 2/2015 | Westphal | |
| 2016/0080261 A1* | 3/2016 | Koponen | H04L 45/72 |
| | | | 370/392 |
| 2016/0105471 A1* | 4/2016 | Nunes | H04L 45/64 |
| | | | 709/228 |
| 2017/0063782 A1* | 3/2017 | Jain | H04L 63/029 |
| 2018/0013717 A1 | 1/2018 | Babaria et al. | |
| 2018/0063077 A1* | 3/2018 | Tumuluru | H04W 28/0273 |
| 2018/0295036 A1* | 10/2018 | Krishnamurthy | G06F 9/45558 |
| 2019/0190837 A1* | 6/2019 | Wright | H04L 47/263 |
| 2020/0204492 A1* | 6/2020 | Sarva | H04L 41/0803 |

FOREIGN PATENT DOCUMENTS

| | | |
|---|---|---|
| CN | 106603566 A | 4/2017 |
| CN | 106878179 A | 6/2017 |

OTHER PUBLICATIONS

Srisuresh et al, "IP Network Address Translator (NAT) Teeminology and Considerations" Internet Engineering Task Force,IETF;Standard,Internet Society (ISOC) 4, Geneva, Switzerland Aug. 1, 1999.

The China National Intelleectual Property Administration (CNIPA) The China Search Report for 201810701206.5 dated Apr. 17, 2020 5 Pages.

The World Intellectual Property Organization (WIPO) International Search Report and Written Opinion for PCT/CN2018/101522 dated Mar. 14, 2019 9 Pages.

* cited by examiner

METHOD AND SERVER FOR DETERMINING A MAPPING ADDRESS OF A DATA STREAM

CROSS-REFERENCES TO RELATED APPLICATIONS

This application is a national phase entry under 35 U.S.C § 371 of International Application No. PCT/CN2018/101522 filed on Aug. 21, 2018, which claims priority of Chinese Patent Application No. 2018107012065, filed with the State Intellectual Property Office of P. R. China on Jun. 29, 2018, the entire contents of all of which are incorporated herein by reference.

FIELD OF DISCLOSURE

The present disclosure generally relates to the field of Internet technology and, more particularly, relates to a method and server for determining a mapping address of a data stream.

BACKGROUND

With the continuous development of Internet technology, the number of terminal devices on the Internet is also increasing. In order to alleviate the problem of depletion of IP addresses due to the increased number of terminal devices, a Network Address Translation (NAT) device has been created. The NAT device may map a private IP address of certain terminal devices in a specialized network to a public IP address on the Internet, to allow a small number of public IP addresses to be used to represent a large number of private IP addresses.

Currently, when a NAT device is running, it usually needs to follow a bysource mechanism. The bysource mechanism may maintain the history consistency of data streams, that is, data streams from the same source IP address should be mapped to the same IP address. For example, if the protocol is consistent, the source IP address of a data stream is 1.1.1.1:1. When the data stream is sent to a target IP address 114.114.114.114:53, the NAT device maps its source IP address to 3.3.3.3:3, thus forming a data stream from 3.3.3.3:3 to 114.114.114.114:53. Thereafter, when the source IP address 1.1.1.1:1 subsequently initiates a data stream to 8.8.8.8:53, according to the history consistency, the NAT device needs to also map the source IP address 1.1.1.1:1 to 3.3.3.3:3, thus forming a data stream from 3.3.3.3:3 to 8.8.8.8:53.

However, in real applications, the bysource mechanism may conflict with actual service configuration. For example, the actual service configuration may need to determine the mapping address of a data stream according to the target IP, while the bysource mechanism determines the mapping address of the data stream according to the source information. In this situation, since the bysource mechanism has a higher priority in the kernel, the eventually mapped address does not match the actual service configuration. As can be seen, the bysource mechanism followed by the current NAT devices is not flexible enough to be compatible with the actual service configuration.

BRIEF SUMMARY OF THE DISCLOSURE

The objective of the present disclosure is to provide a method and server for determining a mapping address of a data stream, which may be compatible with actual service configuration.

To achieve the above objective, in one aspect, the present disclosure provides a method for determining a mapping address of a data stream. The method includes: receiving a newly created current data stream, and recording a configuration identifier and a route identifier of the current data stream; querying, according to source information of the current data stream, a historical data stream that matches the current data stream, where the source information includes at least a source transport protocol, a source address, and a source port, and the historical data stream includes a target mapping address; and comparing the configuration identifier and the route identifier of the current data stream with a configuration identifier and a route identifier of the historical data stream, and determining, according to a comparison result, whether the current data stream continues to use the target mapping address of the historical data stream.

To achieve the above objective, in another aspect, the present disclosure provides a server for determining a mapping address of a data stream. The server includes a current data stream receiving unit that is configured to receive a newly created current data stream, and record a configuration identifier and a route identifier of the current data stream; a historical data stream matching unit that is configured to query, according to source information of the current data stream, a historical data stream that matches the current data stream, where the source information includes at least a source transport protocol, a source address, and a source port, and the historical data stream includes a target mapping address; and an information comparison unit that is configured to compare the configuration identifier and the route identifier of the current data stream with a configuration identifier and a route identifier of the historical data stream, and determine, according to a comparison result, whether the current data stream continues to use the target mapping address of the historical data stream.

To achieve the above objective, in another aspect, the present disclosure provides a server. The server includes a processor and a memory, where the memory stores computer programs that, when executed by the processor, implement the above-described method(s).

As can be seen above, the technical solutions provided by the present disclosure may record the configuration identifier and the route identifier of the current data stream after receiving the newly created current data stream. The configuration identifier may be used to represent a version of service configuration information of the current data stream. The route identifier may be used to represent a transmission path of the current data stream. When determining whether the current data stream continues to use the mapping address of a historical data stream, the source information of the current data stream may be used as index information to query a historical data stream that matches the current data stream. Next, the configuration identifier and the route identifier of the current data stream are further compared with the configuration identifier and the route identifier of the historical data stream, respectively. If the configuration identifiers and the route identifiers are both consistent, it means that there is no change in either the service configuration information or the transmission path of the current data stream. At this point, the mapping address of the historical data stream may continue to be used. However, if the configuration identifiers are inconsistent, the mapping address of the current data stream may be determined according to the actual service configuration. Under the condition that the configuration identifiers are consistent, if the route identifiers are inconsistent, the priorities of the current route and the historical route may be compared to select the mapping address. It can be seen that, besides weighing the source information of the current data stream and the historical data stream, the technical solutions provided by the present disclosure may further compare the configuration identifiers and the route identifiers of the two data streams. This allows the mapping address of the current data stream to be consistent with the actual service configuration information, thereby solving the conflict problem between the bysource mechanism and the service configuration information.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objective, technical solutions, and advantages of the present disclosure clearer, the present disclosure will be made in detail hereinafter with reference to the accompanying drawings.

Embodiment 1

Figure 1:
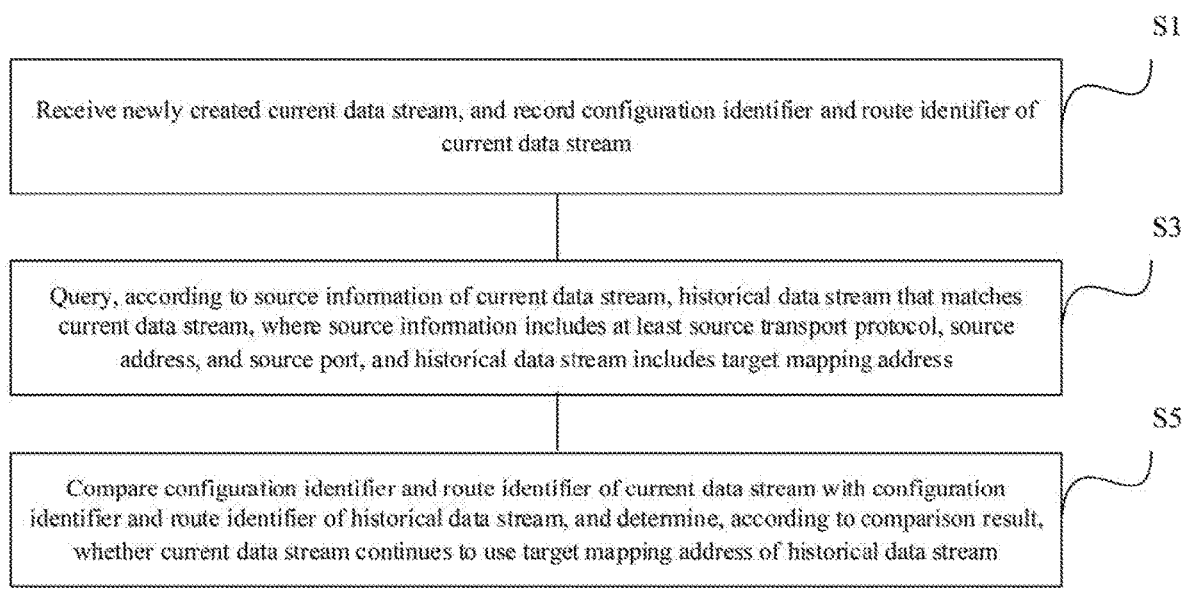
FIG. 1 is a flowchart of a method for determining a mapping address of a data stream according to some embodiments of the present disclosure.
Figure 2:
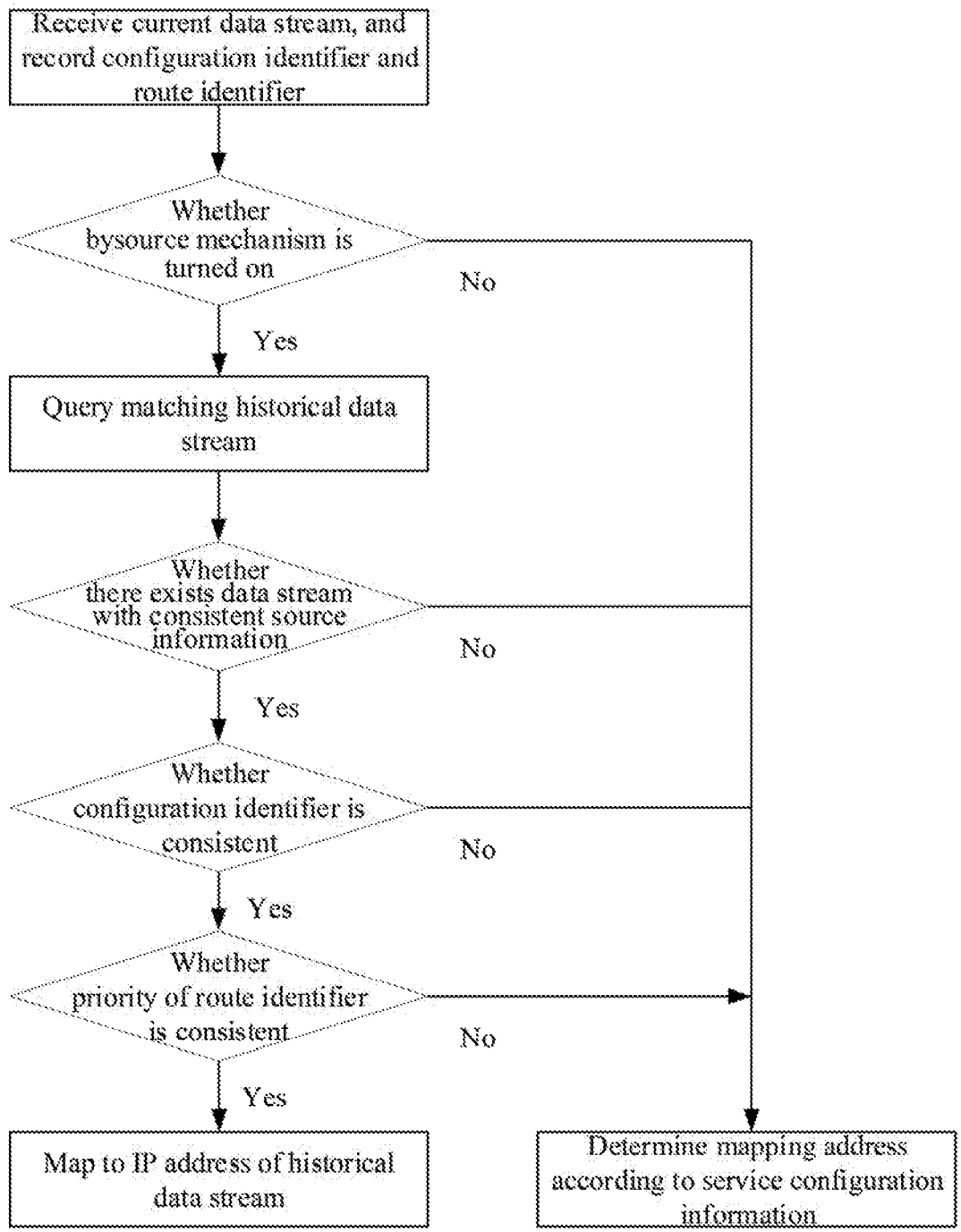
FIG. 2 is a flow diagram for determining a mapping address of a data stream according to some embodiments of the present disclosure.

The implementations of the present disclosure provide a method for determining a mapping address of a data stream. The method may be applied to a server having a NAT function. Specifically, referring to FIG. 1 and FIG. 2, the method may include the following steps.

S1: Receive a newly created current data stream, and record a configuration identifier and a route identifier of the current data stream.

In the disclosed implementation, after a newly created current data stream reaches a server, the server may parse the quintuple information in the current data stream. In this way, the server may acquire information on the current data stream, such as the source address, source port, source transport protocol, target address, and target port. Here, the source address, source port, and source transport protocol of the current data stream may be considered as the source information of the current data stream.

In the disclosed implementation, according to the characteristics of the data stream, the transmission path of the current data stream may be determined according to the service configuration. The transmission path may be represented by a route identifier. Accordingly, based on the transmission path of the current data stream, a route identifier may be assigned to the current data stream. Specifically, a unique route identifier may be respectively set for each transmission path in the server. In this way, after determining the transmission path of the current data stream, the server may query and record the route identifier corresponding to the transmission path. Because the route identifiers are unique, the same transmission path will have the same route identifier, while different transmission paths will have different route identifiers.

In the disclosed implementation, considering that the actual service configuration information of a data stream may have a large impact on the transmission of the data stream, the server may thus also record a configuration identifier for the current data stream. Here, the configuration identifier may be used to represent a version of the service configuration information. Different versions of service configuration information have different configuration identifiers. In this way, a configuration identifier may be assigned for the current data stream according to the configuration version used by the current data stream. In the disclosed implementation, a configuration identifier and a route identifier may be a character string or a digital code, which is not limited in the present disclosure.

S3: Query a historical data stream that matches the current data stream according to the source information of the current data stream, where the source information includes at least the source transport protocol, source address, and source port, and the historical data stream includes a target mapping address.

In the disclosed implementation, a control for controlling the bysource mechanism to turn on or off may be set in advance. The control may be a program component, and the turn on or off function implemented by the program component may be achieved through certain instructions. For example, the address mapping turn on function or the address mapping turn off function may be triggered by a command line, or an interactive gesture, etc.

In the disclosed implementation, when the current state of the control indicates that the bysource mechanism is turned off, it means that the mapping address of the current data stream does not need to be determined by the bysource mechanism, but may be determined according to the service configuration information of the current data stream. That is, when the bysource mechanism is turned off, the historical record of the address mapping may be saved in the application layer (rather than the kernel layer) according to the actual service configuration information, so that the bysource mechanism in the kernel layer may be circumvented.

In the disclosed implementation, if the current state of the control indicates that the bysource mechanism is turned on, it means that the mapping address of the current data stream needs to be determined by using the bysource mechanism provided by the present disclosure. Specifically, a historical data stream that matches the current data stream may be first queried according to the source information of the current data stream. In real applications, the source information of the current data stream may be used as the index information. A historical data stream that has the same source information as the current data stream may be determined as the historical data stream that matches the current data stream.

In general, historical data streams that have been previously created are usually stored in the server as historical records. In order not to occupy the storage space of the server for a long time, the server usually sets a specified tracking time-length when a historical data stream is created. A specified tracking time-length may be used to limit the time-length that a historical data stream remains inactive. If the time-length that a historical data stream remains inactive reaches the specified tracking time-length, the historical record of the historical data stream may be deleted from the server. In general, if a specified tracking time-length is too long, it will lead to unreasonable traffic load and improper routing of a data stream. Accordingly, in the disclosed implementation, a specified tracking time-length may be flexibly set according to the actual state of a data stream, so that the historical record of a historical data stream remaining in the inactive state may be deleted from the server in time.

In the disclosed implementation, once the time-length of a historical data stream remaining in the inactive state reaches the specified tracking time-length, the historical data stream may not be queried in the server. In view of this, when the server queries a historical data stream that matches the current data stream, it may collect the inactiveness time-length of each historical data stream, in the historical data stream set, that remains in an inactive state, and determine candidate historical data streams, in the historical data stream set, whose inactiveness time-lengths are less than the specified tracking time-lengths. The historical data stream set may be a database in the server for storing the historical data streams that have been previously created. The candidate historical data streams filtered from the historical data stream set are currently all in an active state. The mapping addresses used by the candidate historical data streams may have a retroactive effect on the newly created data stream. When determining the mapping address of the current data stream, a historical data stream matching the current data stream may be determined from the candidate historical data streams. Specifically, the source information of the current data stream may be used as index information, and a historical data stream, in the candidate historical data streams, that has the same source information as the current data stream may be determined as the historical data stream that matches the current data stream.

In the disclosed implementation, the historical record of a historical data stream usually includes a target mapping address corresponding to the historical data stream at the time of transmission. For example, the source address of a historical data stream is 1.1.1.1:1. When the NAT device processes the historical data stream, the source address is mapped to 3.3.3.3:3. The mapped address may be then considered as the target mapping address of the historical data stream. In the disclosed implementation, a determination policy described next may be used to determine whether the current data stream continues to use the target mapping address.

S5: Compare the configuration identifier and route identifier of the current data stream with the configuration identifier and route identifier of the historical data stream, and determine, based on the comparison result, whether the current data stream continues to use the target mapping address of the historical data stream.

In the disclosed implementation, after the matching historical data stream is obtained according to the source information of the current data stream, the configuration identifier and route identifier of the current data stream and the configuration identifier and route identifier of the historical data stream may be further compared. Here, since a configuration identifier may represent the version of service configuration information, if the configuration identifiers are inconsistent, it means that although the current data stream and the historical data stream have the same source information, their actual service configuration information has already changed. At this moment, the target mapping address of the historical stream data is no longer applicable to the current data stream. Accordingly, under this situation, the current data stream may not continue to use the target mapping address of the historical data stream, but rather determines the mapping address of the current data stream according to the service configuration information of the current data stream.

On the other hand, if the configuration identifier of the current data stream and the configuration identifier of the historical data stream are consistent, it means that the two data streams have the same service configuration information. In this situation, it may be further determined whether the route identifiers of the two data streams are consistent. Generally, if the route identifiers of the two data streams are inconsistent, it means that the transmission paths selected by the current data stream and the historical data stream may be inconsistent. If the two transmission paths are inconsistent, the actual mapping address corresponding to the source address of the current data stream may be also inconsistent with the target mapping address of the historical data stream. In this situation, instead of following the conventional bysource mechanism, the mapping address of the current data stream may be determined according to the service configuration information of the current data stream.

Apparently, in real applications, when the route identifiers of the current data stream and the historical data stream are inconsistent, it does not mean that the mapping addresses of the two data streams are absolutely impossible to be consistent. In some scenarios, if the cost-effectiveness ratio of the transmission path selected by the current data stream is not as high as the cost-effectiveness ratio of the transmission path selected by the historical data stream, the current data stream may be forced to keep the same mapping address as the historical data stream. For example, the transmission path selected by the historical data stream is from Guangdong to Shanghai to Suzhou, while the transmission path selected by the current data stream is from Guangdong to Wenzhou to Suzhou. The communication cost of the transmission path selected by the current data stream is likely to be higher. Accordingly, in this situation, the current data stream may be forced to select the transmission path from Guangdong to Shanghai to Suzhou, so that the mapping address of the current data stream remains to be consistent with the mapping address of the historical data stream, even the two data streams have inconsistent routing identifiers. Specifically, in the server, a priority may be set in advance for each route identifier. In this way, a route identifier itself may signify the priority of a route (transmission path). The higher the priority, the higher the cost-effectiveness ratio of a transmission path associated with a route identifier. Then, under the situation that the configuration identifier of the current data stream is consistent with the configuration identifier of the historical data stream, the priority signified by the route identifier of the current data stream and the priority signified by the route identifier of the historical data stream may be compared. According to the comparison result, it may be determined whether the current data stream continues to use the target mapping address of the historical data stream. Specifically, if the priority of the route identifier of the current data stream is higher than the priority of the route identifier of the historical data stream, it means that the transmission path currently selected by the current data stream is cost-effective. Accordingly, the target mapping address of the historical data stream may not be used, but rather the mapping address of the current data stream is determined according to the service configuration information of the current data stream. On the other hand, if the priority of the route identifier of the current data stream is lower than or equal to the priority of the route identifier of the historical data stream, it means that the transmission path currently selected by the current data stream is not as cost-effective as the transmission path selected by the historical data stream. In this situation, the source address of the current data stream may be mapped to the target mapping address of the historical data stream, to allow the mapping address of the current data stream to remain consistent with the historical data stream.

In the disclosed implementation, if the configuration identifier and the route identifier of the current data stream are consistent with the configuration identifier and the route identifier of the historical data stream, respectively, it means that the current data stream and the historical data stream have the same service configuration information and have selected the same transmission path. In this situation, the source address of the current data stream may be directly mapped to the target mapping address of the historical data stream.

As can be seen from the above, the technical solutions provided by the present disclosure may flexibly adjust a specified tracking time-length according to the actual state of a data stream, thereby alleviating the problems of unreasonable traffic load and improper routing of a data stream. In addition, through setting a control for controlling the bysource mechanism to turn on or off, it is possible to choose to follow the bysource mechanism or the actual service configuration information in determining the mapping address of a data stream. Further, by adding, on the basis of source information, an extra process of comparing the configuration identifiers and the route identifiers, the impact of service configuration information and transmission path on the mapping address may be fully considered, to allow the mapping address selected by the current data stream to be more reasonable.

Embodiment 2

Figure 3:
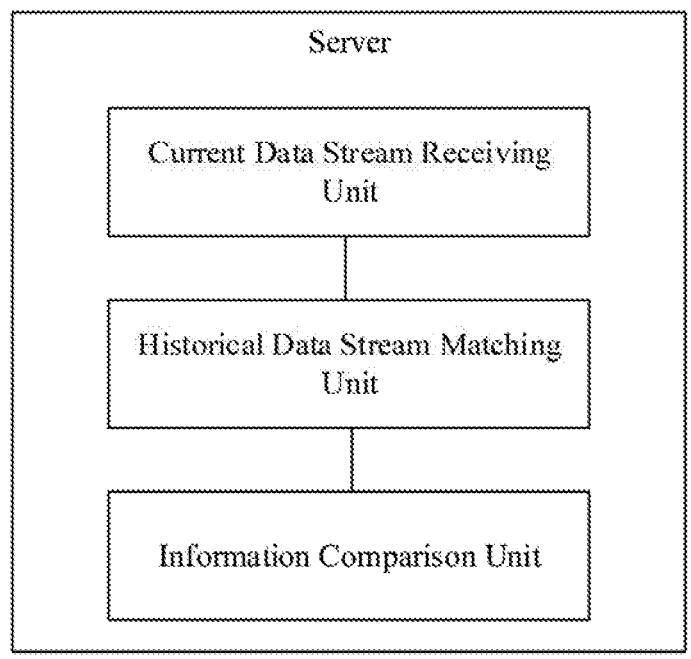
FIG. 3 is a functional block diagram of a server according to some embodiments of the present disclosure.

Referring to FIG. 3, the present disclosure further provides a server. The server comprises:

a current data stream receiving unit that is configured to receive a newly created current data stream, and record a configuration identifier and a route identifier of the current data stream;

a historical data stream matching unit that is configured to query, according to source information of the current data stream, a historical data stream that matches the current data stream, where the source information includes at least a source transport protocol, a source address, and a source port, and the historical data stream includes a target mapping address; and an information comparison unit that is configured to compare the configuration identifier and the route identifier of the current data stream with a configuration identifier and a route identifier of the historical data stream, and determine, according to a comparison result, whether the current data stream continues to use the target mapping address of the historical data stream.

In one implementation, the server provides a control for controlling a bysource mechanism to turn on or off; correspondingly, the server further includes:

a function determination unit that is configured to, if a current state of the control indicates that the bysource mechanism is turned on, query the historical data stream that matches the current data stream according to the source information of the current data stream, and if the current state of the control indicates that the bysource mechanism is turned off, determine a mapping address of the current data stream according to service configuration information of the current data stream.

In one implementation, the server sets a specified tracking time-length in advance; correspondingly, the historical data stream matching unit includes:

an inactiveness time-length filtering module that is configured to collect an inactiveness time-length of each historical data stream, in a historical data stream set, that remains in an inactive state, and determine candidate historical data streams, in the historical data stream set, whose inactiveness time-lengths are less than specified tracking time-lengths; and a historical data stream determination module that is configured to determine, in the candidate historical data streams, a historical data stream, that has the same source information as the current data stream, as the historical data stream that matches the current data stream.

In one implementation, a route identifier is configured to signify a priority of a route; correspondingly, the information comparison unit includes:

a priority comparison module that is configured to, when the configuration identifier of the current data stream is consistent with the configuration identifier of the historical data stream, compare a priority signified by the route identifier of the current data stream with a priority signified by the route identifier of the historical data stream, and determine, according to a result of comparison, whether the current data stream continues to use the target mapping address of the historical data stream.

In one implementation, the information comparison unit is configured to, if the priority of the route identifier of the current data stream is higher than the priority of the route identifier of the historical data stream, determine a mapping address of the current data stream according to service configuration information of the current data stream; and if the priority of the route identifier of the current data stream is lower than or equal to the priority of the route identifier of the historical data stream, map the source address of the current data stream to the target mapping address of the historical data stream.

Figure 4:
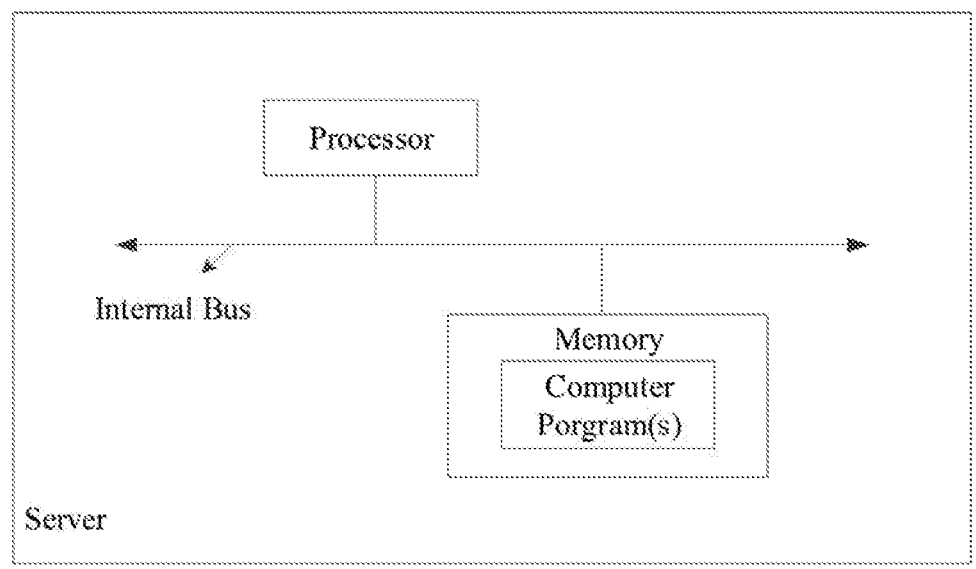
FIG. 4 is a schematic structural diagram of a server according to some embodiments of the present disclosure.

Referring to FIG. 4, the present disclosure further provides a server. The server includes a memory and a processor. The memory stores computer programs that, when executed by the processor, implement the above-described methods.

Figure 5:
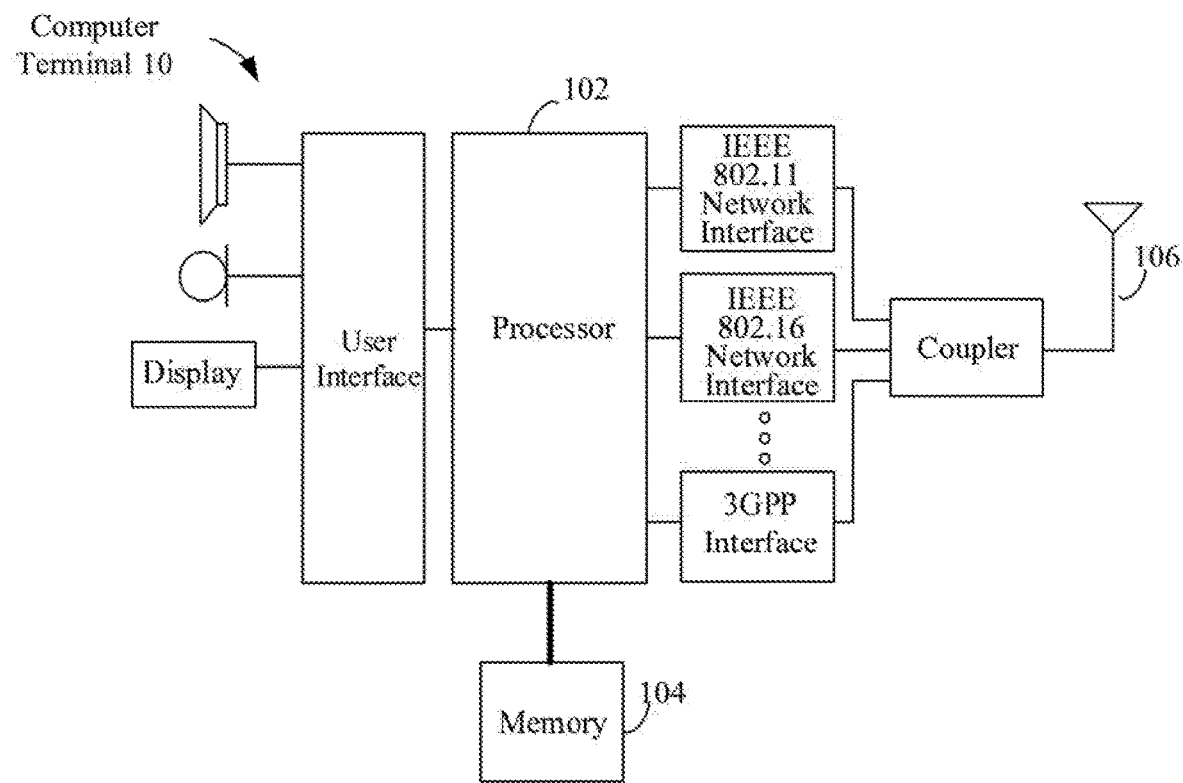
FIG. 5 is a schematic structural diagram of a computer terminal according to some embodiments of the present disclosure.

Referring to FIG. 5, in the present disclosure, the technical solutions of the disclosed embodiments may be applied to a computer terminal 10 shown in FIG. 5. The computer terminal 10 may include one or more (only one is shown in the figure) processors 102 (a processor 102 may include, but is not limited to, a processing device such as a microcontroller MCU or a programmable logic device FPGA), a memory 104 for storing data, and a transmission device 106 for communication purpose. It is to be understood by those skilled in the art that the structure shown in FIG. 5 is provided by way of illustration, but not by way of limitation of the structures of the above-described electronic devices. For example, the computer terminal 10 may also include more or fewer components than those shown in FIG. 5, or have a different configuration than that shown in FIG. 5.

The memory 104 may be used to store software programs and modules of application software. The processor 102 implements various functional applications and data processing by executing software programs and modules stored in the memory 104. The memory 104 may include a high-speed random-access memory, and also a non-volatile memory, such as one or more magnetic storage devices, flash memory, or other non-volatile solid-state memory. In some applications, the memory 104 may further include a memory remotely disposed with respect to the processor 102, which may be connected to the computer terminal 10 through a network. Examples of such network include, but are not limited to, the Internet, an intranet, a local area network, a mobile communication network, and combinations thereof.

The transmission device 106 is configured to receive or transmit data via the network. The aforementioned specific examples of the network may include a wireless network provided by the communication provider of the computer terminal 10. In one application, the transmission device 106 includes a network interface controller (NIC) that may be connected to other network devices through the base stations to allow it to communicate with the Internet. In one application, the transmission device 106 may be a Radio Frequency (RF) module that is configured to communicate with the Internet via a wireless approach.

As can be seen above, the technical solutions provided by the present disclosure may record the configuration identifier and the route identifier of the current data stream after receiving the newly created current data stream. The configuration identifier may be used to represent a version of service configuration information of the current data stream. The route identifier may be used to represent a transmission path of the current data stream. When determining whether the current data stream continues to use the mapping address of a historical data stream, the source information of the current data stream may be used as index information to query a historical data stream that matches the current data stream. Next, the configuration identifier and the route identifier of the current data stream are further compared with the configuration identifier and the route identifier of the historical data stream, respectively. If the configuration identifiers and the route identifiers are both consistent, it means that there is no change in either the service configuration information or the transmission path of the current data stream. At this point, the mapping address of the historical data stream may continue to be used. However, if the configuration identifiers are inconsistent, the mapping address of the current data stream may be determined according to the actual service configuration. Under the condition that the configuration identifiers are consistent, if the route identifiers are inconsistent, the priorities of the current route and the historical route may be compared to select the mapping address. It can be seen that, besides weighing the source information of the current data stream and the historical data stream, the technical solutions provided by the present disclosure may further compare the configuration identifiers and the route identifiers of the two data streams. This allows the mapping address of the current data stream to be consistent with the actual service configuration information, thereby solving the conflict problem between the bysource mechanism and the service configuration information.

Through the description of the foregoing embodiments, a person skilled in the art may well understand that the various embodiments may be implemented by means of software plus the necessary general hardware platform, or apparently, by means of hardware. In light of this understanding, the above-described technical solutions, or the essential parts that contribute to the existing technologies, may be embodied in the form of software products. The computer software products may be stored in computer-readable storage media, such as ROM/RAM, disks, CD-ROMs, etc., and include a series of instructions for enabling a computer device (such as a personal computer, a server, or a network device) to implement each embodiment or certain portions of methods described in each embodiment.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for determining a mapping address of a data stream, comprising:
    receiving a newly created current data stream, and recording a configuration identifier and a route identifier of the current data stream;
    querying, according to source information of the current data stream, a historical data stream that matches the current data stream, wherein the source information includes at least a source transport protocol, a source address, and a source port, and the historical data stream includes a target mapping address; and
    comparing the configuration identifier and the route identifier of the current data stream with a configuration identifier and a route identifier of the historical data stream, and determining, according to a comparison result, whether the current data stream continues to use the target mapping address of the historical data stream.

2. The method according to claim 1, after receiving the newly created current data stream, the method further includes:
    if a current state of a control, for controlling a bysource mechanism to turn on or off, indicates that the bysource mechanism is turned on, querying the historical data stream that matches the current data stream according to the source information of the current data stream; and
    if the current state of the control indicates that the bysource mechanism is turned off, determining a mapping address of the current data stream according to service configuration information of the current data stream.

3. The method according to claim 1, wherein querying the historical data stream that matches the current data stream further includes:
    determining a historical data stream, that has the same source information as the current data stream, as the historical data stream that matches the current data stream.

4. The method according to claim 1, further comprising:
    setting a specified tracking time-length in advance; and
    wherein querying the historical data stream that matches the current data stream further includes:
    collecting an inactiveness time-length of each historical data stream, in a historical data stream set, that remains in an inactive state, and determining candidate historical data streams, in the historical data stream set, whose inactiveness time-lengths are less than specified tracking time-lengths, and
    determining, in the candidate historical data streams, a historical data stream, that has the same source information as the current data stream, as the historical data stream that matches the current data stream.

5. The method according to claim 1, wherein determining whether the current data stream continues to use the target mapping address of the historical data stream further includes:
    if the configuration identifier and the route identifier of the current data stream are consistent with the configuration identifier and the route identifier of the historical data stream, respectively, mapping the source address of the current data stream to the target mapping address of the historical data stream; and
    if the configuration identifier of the current data stream is inconsistent with the configuration identifier of the historical data stream, or the route identifier of the current data stream is inconsistent with the route identifier of the historical data stream, determining a mapping address of the current data stream according to service configuration information of the current data stream.

6. The method according to claim 1, wherein a route identifier is configured to signify a priority of a route, and determining whether the current data stream continues to use the target mapping address of the historical data stream furhter includes:
    when the configuration identifier of the current data stream is consistent with the configuration identifier of the historical data stream, comparing a priority signified by the route identifier of the current data stream with a priority signified by the route identifier of the historical data stream, and determining, according to a result of comparison, whether the current data stream continues to use the target mapping address of the historical data stream.

7. The method according to claim 6, wherein determining, according to the result of comparison, whether the current data stream continues to use the target mapping address of the historical data stream further includes:
    if the priority of the route identifier of the current data stream is higher than the priority of the route identifier of the historical data stream, determining a mapping address of the current data stream according to service configuration information of the current data stream; and
    if the priority of the route identifier of the current data stream is lower than or equal to the priority of the route identifier of the historical data stream, mapping the source address of the current data stream to the target mapping address of the historical data stream.

8. The method according to claim 1, after newly creating the current data stream, the method further includes:
    assigning a configuration identifier to the current data stream according to a configuration version used by the current data stream, and assigning a route identifier to the current data stream according to a transmission path of the current data stream.

9. A server, comprising:
    a current data stream receiving unit that is configured to receive a newly created current data stream, and record a configuration identifier and a route identifier of the current data stream;
    a historical data stream matching unit that is configured to query, according to source information of the current data stream, a historical data stream that matches the current data stream, wherein the source information includes at least a source transport protocol, a source address, and a source port, and the historical data stream includes a target mapping address; and
    an information comparison unit that is configured to compare the configuration identifier and the route identifier of the current data stream with a configuration identifier and a route identifier of the historical data stream, and determine, according to a comparison result, whether the current data stream continues to use the target mapping address of the historical data stream.

10. The server according to claim 9, wherein the server provides a control for controlling a bysource mechanism to turn on or off, and the server further includes:
    a function determination unit that is configured to, if a current state of the control indicates that the bysource mechanism is turned on, query the historical data stream that matches the current data stream according to the source information of the current data stream, and if the current state of the control indicates that the bysource mechanism is turned off, determine a mapping address of the current data stream according to service configuration information of the current data stream.

11. The server according to claim 9, wherein the server sets a specified tracking time-length in advance, and the historical data stream matching unit further includes:
    an inactiveness time-length filtering module that is configured to collect an inactiveness time-length of each historical data stream, in a historical data stream set, that remains in an inactive state, and determine candidate historical data streams, in the historical data stream set, whose inactiveness time-lengths are less than specified tracking time-lengths; and
    a historical data stream determination module that is configured to determine, in the candidate historical data streams, a historical data stream, that has the same source information as the current data stream, as the historical data stream that matches the current data stream.

12. The server according to claim 9, wherein a route identifier is configured to signify a priority of a route, and the information comparison unit further includes:
    a priority comparison module that is configured to, when the configuration identifier of the current data stream is consistent with the configuration identifier of the historical data stream, compare a priority signified by the route identifier of the current data stream with a priority signified by the route identifier of the historical data stream, and determine, according to a result of comparison, whether the current data stream continues to use the target mapping address of the historical data stream.

13. The server according to claim 12, wherein the information comparison unit is further configured to, if the priority of the route identifier of the current data stream is higher than the priority of the route identifier of the historical data stream, determine a mapping address of the current data stream according to service configuration information of the current data stream, and if the priority of the route identifier of the current data stream is lower than or equal to the priority of the route identifier of the historical data stream, map the source address of the current data stream to the target mapping address of the historical data stream.

14. A server, comprising a processor and a memory, wherein the memory stores computer programs that, when executed by the processor, implement a method for determining a mapping address of a data stream, the method comprising:

receiving a newly created current data stream, and recording a configuration identifier and a route identifier of the current data stream;

querying, according to source information of the current data stream, a historical data stream that matches the current data stream, wherein the source information includes at least a source transport protocol, a source address, and a source port, and the historical data stream includes a target mapping address; and comparing the configuration identifier and the route identifier of the current data stream with a configuration identifier and a route identifier of the historical data stream, and determining, according to a comparison result, whether the current data stream continues to use the target mapping address of the historical data stream.

* * * * *